UNITED STATES PATENT OFFICE.

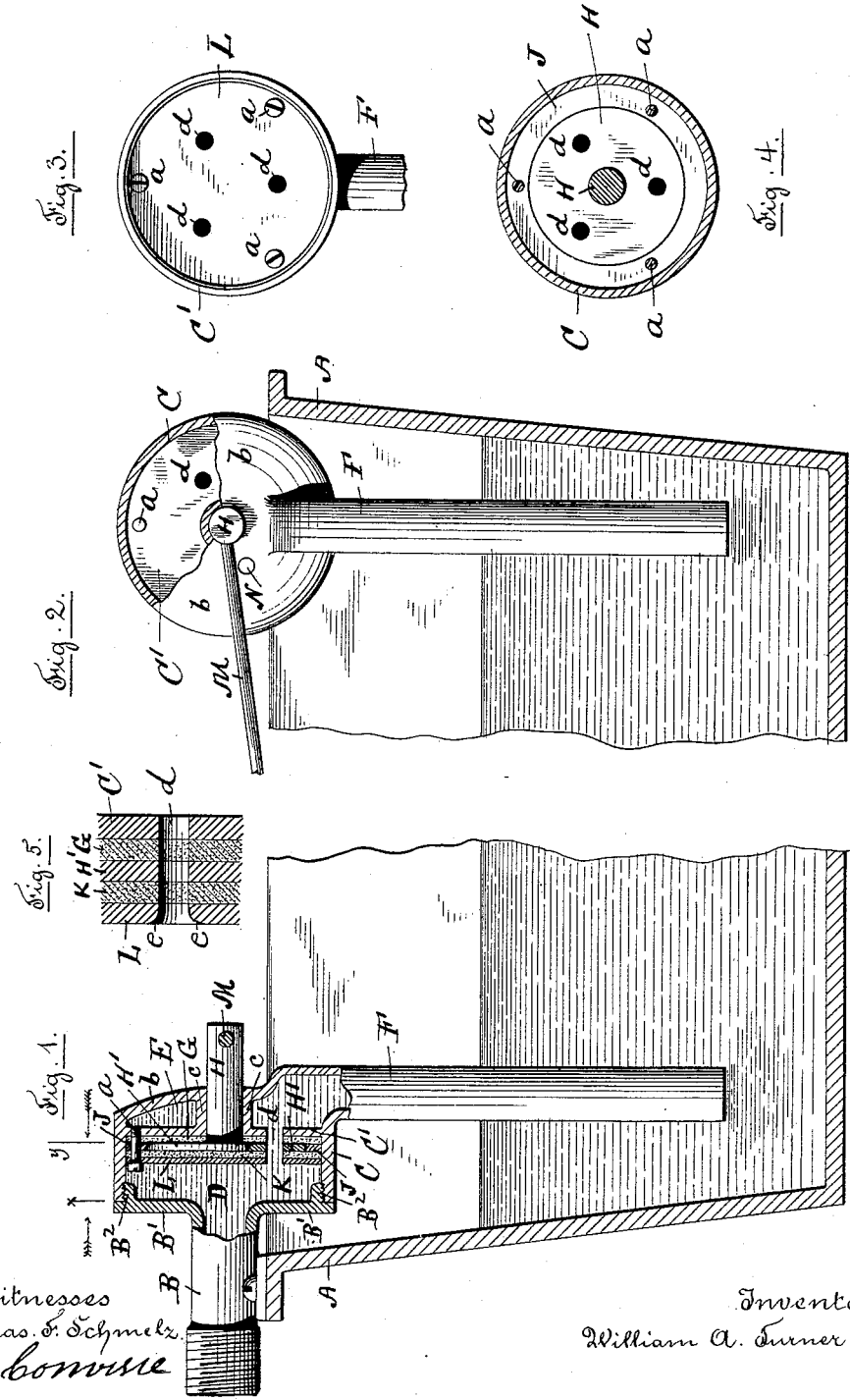

WILLIAM A. TURNER, OF WORCESTER, MASSACHUSETTS, ASSIGNOR TO EDMUND CONVERSE, OF SAME PLACE.

BALL-COCK VALVE.

SPECIFICATION forming part of Letters Patent No. 481,317, dated August 23, 1892.

Application filed December 28, 1889. Serial No. 335,273. (No model.)

*To all whom it may concern:*

Be it known that I, WILLIAM A. TURNER, a citizen of the United States, and a resident of Worcester, in the county of Worcester and State of Massachusetts, have invented a new and useful Improvement in Ball-Cock Valves, of which the following is a specification, reference being made to the accompanying drawings, forming a part of the specification, and in which—

Figure 1 denotes a sectional view of a portion of a flushing-tank containing one of my improved ball-cock valves, which is represented in sectional view. Fig. 2 is an end view of the ball-cock valve embodying my invention with a portion of the outer shell or case broken away in order to disclose the interior. Fig. 3 represents a sectional view on line X X, Fig. 1. Fig. 4 is a sectional view on line Y Y, Fig. 1; and Fig. 5 is an enlarged sectional view of a portion of the metal and elastic packing-disks and showing one of the water-passages through which the water passes from the supply-pipe into the tank.

Similar letters refer to similar parts in the several figures.

The object of my invention is to provide a valve which shall be operated by a hollow ball or float to supply a determined quantity of water to a flushing or other water-tank; and my invention consists in the construction and arrangement of the several parts of the valve in connection with the float or operative device by which the valve is caused to open or close with reference to the water-line in the tank, as hereinafter described, and specifically set forth in the subjoined claims.

Referring to the accompanying drawings, A denotes a portion of the water-tank, to which water is admitted through a supply-pipe B. B' represents a radial flange formed upon the supply-pipe B and provided with the screw-threaded flange B² to receive the screw-threaded cylinder C, which is divided in a vertical plane by a metallic partition C' into the chambers D and E, the chamber D communicating with the pipe B and the chamber E communicating with the vertical pipe F, leading into the water-tank A. Against the metallic partition C' is placed an annular washer G, of leather or semi-elastic material, provided with a central opening to allow the stem H of the metallic disk H' to pass. Against the washer G is an annular ring J of metal and slightly thicker than the metallic disk H'. A leather or semi-elastic washer K is placed next the annular ring J and disk H', and against the washer K is a metallic disk L. Bolts *a a a* are screwed into the partition C', passing through the disk L, washers K and G, and annular ring J, with their heads resting upon the outer surface of the metallic disk L, firmly clamping the metallic disk, leather washers, and annular ring against the partition C'. The outer shell *b* of the cylindrical case C is connected at *c* with the partition C', forming a journal-bearing for the stem H of the metallic disk H'. A radial lever or arm M is connected with the stem H, and to the outer end of the arm or lever M is attached a hollow ball or float in the usual and well-known manner, which is raised by the rising water in the tank and is allowed to fall by its own gravity as the water in the tank recedes. One or more holes *d* are made in the partition C' and through the leather washers G and K and metallic disk L, the coincident holes forming a passage from the chamber D to the chamber E and constituting a waterway from one chamber to the other. Corresponding holes are formed in the disk H', which are made to coincide with the waterways when the water in the tank falls below the high-water line.

In the accompanying drawings I have shown three water-ways *d d d*, and as the water recedes in the tank the ball or float falls in the usual manner, the angular movement of the lever M rotating the stem H and its attached disk H' and causing the holes in the disk H' to coincide with the water-ways *d d d*, allowing the water in the chamber D to flow through the water-ways *d d d* into the chamber E, and thence through the outlet-pipe into the tank A. In order to prevent the continued falling of the water-line in the tank to close the water-ways, I provide means whereby the angular movement of the lever M is checked in its downward motion. In the present instance it consists of a stop N, projecting from the outer surface of the shell or case *b*, against which the lever M strikes. As the tank A is filled with water the stem H is rotated by the rising of the ball or float, rotating the disk H' and closing the water-ways d d d and checking the flow of water into the tank A. The space between the leather washers G and K and inclosed by the annular ring J forms a chamber, which is filled by the rotating disk H', which is packed by the washers G and K, the pressure of the washer K being increased by the water-pressure upon the metallic disk L in case of high-water pressures, while the presence of a high-water pressure upon the metallic disk L does not retard the free rotation of the disk H', which rotates independently of the water-pressure.

The lining of the water-way is composed of alternate layers of metal and leather or other analogous semi-elastic material, which materially checks the hissing sound incident to the rapid flow of a contracted stream of water. The noiselessness of the flowing streams of water through the water-ways d d d is also partially secured by forming the inner end of each of the water-ways d d d slightly flaring or "bell-mouthed," as represented in Fig. 5, in which the corner surrounding one of the holes or water-ways d is represented at e as slightly chamfered, enlarging the entrance to the water-way and preventing the impingement of the flowing stream upon the angular corner of the opening, thereby greatly reducing the noise of the stream when forced through the water-way under high pressure.

What I claim as my invention, and desire to secure by Letters Patent, is—

1. The combination, with a supply-pipe having a transverse partition closing the passage-way and provided with an opening through said partition, of a spindle journaled in said partition, a disk attached to said spindle and provided with an opening, which is brought coincident with the opening in said partition by the rotation of said spindle, an annular ring inclosing said rotating disk, and a metallic disk covering said annular ring, said ring and said metallic disk being attached to said transverse partition and forming a chamber for said rotating disk, substantially as described.

2. The combination of the water-supply pipe B, having a radial flange B' and a concentric screw-threaded flange B², a cylinder C, held upon said screw-threaded flange and provided with a transverse partition dividing said cylinder into the chambers D and E, delivery-pipe F, annular ring J, and metallic disk L, forming a chamber for a rotating disk, rotating disk H', inclosed in said chamber, and attached spindle H, journaled concentrically with said transverse partition, said transverse partition and said rotating disk being provided with openings which are brought coincident by the rotation of said disk, substantially as described.

3. In a ball-cock valve, the combination, with the water-supply pipe provided with a partition having one or more holes, forming water-ways, of a semi-elastic washer resting against the side of said partition, an annular metallic ring inclosing a chamber for a rotating disk, a rotating disk provided with one or more holes corresponding with said water-ways and operatively connected with a float which is raised by the water in the tank, a semi-elastic washer resting against said disk, and a metallic disk covering said elastic washer, said metallic disk and said interposed elastic washers being attached to said partition, substantially as described.

Dated at Worcester, in the county of Worcester and State of Massachusetts, this 24th day of December, 1889.

WILLIAM A. TURNER.

Witnesses:
E. CONVERSE,
RUFUS B. FOWLER.